United States Patent
Xiong et al.

(10) Patent No.: US 11,657,223 B2
(45) Date of Patent: May 23, 2023

(54) KEYPHASE EXTRACTION BEYOND LANGUAGE MODELING

(71) Applicant: Microsoft Technology Licensing, LLC, Redmond, WA (US)

(72) Inventors: Li Xiong, Kirkland, WA (US); Chuan Hu, Redmond, WA (US); Arnold Overwijk, Redmond, WA (US); Junaid Ahmed, Bellevue, WA (US); Daniel Fernando Campos, Seattle, WA (US); Chenyan Xiong, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/552,742

(22) Filed: Dec. 16, 2021

(65) Prior Publication Data
US 2022/0108078 A1     Apr. 7, 2022

Related U.S. Application Data

(63) Continuation of application No. 16/460,853, filed on Jul. 2, 2019, now Pat. No. 11,250,214.

(51) Int. Cl.
*G06F 40/30* (2020.01)
*G06F 40/284* (2020.01)
(Continued)

(52) U.S. Cl.
CPC ............ *G06F 40/30* (2020.01); *G06F 40/211* (2020.01); *G06F 40/284* (2020.01);
(Continued)

(58) Field of Classification Search
CPC ...... G06F 40/30; G06F 40/284; G06F 40/211; G06K 9/6256; G06K 9/6263
See application file for complete search history.

(56) References Cited

U.S. PATENT DOCUMENTS

| | | |
|---|---|---|
| 8,972,404 B1 | 3/2015 | Lewis et al. |
| 2002/0022956 A1 | 2/2002 | Ukrainczyk et al. |

(Continued)

OTHER PUBLICATIONS

Hu, et al., "Automatic Extraction of Titles from General Documents Using Machine Learning", In Journal of Information Processing and Management, Elsevier, vol. 42, No. 5, Sep. 1, 2006, pp. 1276-1293.

(Continued)

*Primary Examiner* — Kevin Ky
(74) *Attorney, Agent, or Firm* — Calfee, Halter & Griswold LLP

(57) ABSTRACT

A system for extracting a key phrase from a document includes a neural key phrase extraction model ("BLING-KPE") having a first layer to extract a word sequence from the document, a second layer to represent each word in the word sequence by ELMo embedding, position embedding, and visual features, and a third layer to concatenate the ELMo embedding, the position embedding, and the visual features to produce hybrid word embeddings. A convolutional transformer models the hybrid word embeddings to n-gram embeddings, and a feedforward layer converts the n-gram embeddings into a probability distribution over a set of n-grams and calculates a key phrase score of each n-gram. The neural key phrase extraction model is trained on annotated data based on a labeled loss function to compute cross entropy loss of the key phrase score of each n-gram as compared with a label from the annotated dataset.

20 Claims, 7 Drawing Sheets

(51) Int. Cl.
*G06F 40/211* (2020.01)
*G06K 9/62* (2022.01)
*G10L 15/08* (2006.01)
*G06N 3/08* (2023.01)

(52) U.S. Cl.
CPC ......... *G06K 9/6256* (2013.01); *G06K 9/6263* (2013.01); *G06N 3/08* (2013.01); *G10L 2015/088* (2013.01)

(56) References Cited

U.S. PATENT DOCUMENTS

| | | | |
|---|---|---|---|
| 2002/0156653 A1* | 10/2002 | Florio | G06Q 40/08 705/3 |
| 2005/0165753 A1 | 7/2005 | Chen et al. | |
| 2011/0307468 A1* | 12/2011 | Duan | H04L 67/1001 707/711 |
| 2012/0117092 A1 | 5/2012 | Stankiewicz et al. | |
| 2013/0110498 A1 | 5/2013 | Bekkerman et al. | |
| 2013/0346386 A1 | 12/2013 | Zandona et al. | |
| 2014/0074816 A1 | 3/2014 | Banerjee et al. | |
| 2016/0125087 A1* | 5/2016 | Mallah | G06F 16/9535 705/14.54 |
| 2017/0046311 A1 | 2/2017 | Walker | |
| 2017/0124432 A1 | 5/2017 | Chen et al. | |
| 2017/0150235 A1 | 5/2017 | Mei et al. | |
| 2017/0235835 A1* | 8/2017 | Wang | G06Q 50/01 707/706 |
| 2017/0235836 A1* | 8/2017 | Wang | G06Q 50/01 707/730 |
| 2017/0316519 A1* | 11/2017 | Wang | G06N 20/00 |
| 2018/0060423 A1* | 3/2018 | Zheng | G06F 16/353 |
| 2018/0089541 A1 | 3/2018 | Stoop et al. | |
| 2018/0089542 A1 | 3/2018 | Stoop et al. | |
| 2018/0165554 A1 | 6/2018 | Zhang et al. | |
| 2018/0196800 A1 | 7/2018 | Volkovs et al. | |
| 2018/0267996 A1 | 9/2018 | Lin et al. | |
| 2018/0267997 A1 | 9/2018 | Lin et al. | |
| 2019/0130312 A1 | 5/2019 | Xiong et al. | |
| 2020/0110930 A1 | 4/2020 | Simantov et al. | |
| 2020/0151448 A1 | 5/2020 | Lin et al. | |
| 2020/0311468 A1 | 10/2020 | Kim et al. | |
| 2021/0004439 A1 | 1/2021 | Xiong et al. | |

OTHER PUBLICATIONS

Jiang, et al., "A Ranking Approach to Keyphrase Extraction", In Proceedings of the ACM 32nd International ACM SIGIR Conference on Research and development in information retrieval, Jul. 19, 2009, pp. 756-757.

"International Search Report and Written Opinion Issued in PCT Application No. PCT/US2020/036535", dated Sep. 7, 2020, 12 Pages.

"International Search Report and Written Opinion Issued in PCT Application No. PCT/US2020/036537", dated Sep. 9, 2020, 10 Pages.

Sarkar, et al., "Machine Learning Based Keyphrase Extraction: Comparing Decision Trees, Naive Bayes, and Artificial Neural Networks", In Journal of The Journal of Information Processing Systems (JIPS), vol. 8, No. 4, Dec. 1, 2012, pp. 693-712.

Yao, et al., "A Feature Selection Method Based on Synonym Merging in Text Classification System", In EURASIP Journal on Wireless Communications and Networking, vol. 2017, No. 1, Oct. 5, 2017, pp. 1-8.

"Non Final Office Action Issued in U.S. Appl. No. 16/460,776", dated Mar. 4, 2021, 50 Pages.

Thruesen, et al., "To Link or Not to Link: Ranking Hyperlinks in Wikipedia Using Collective Attention", In Proceedings of the IEEE International Conference on Big Data, Dec. 2016, pp. 1709-1718.

Yates, et al., "PageRank As a Method to Rank Biomedical Literature by Importance", In Proceedings of Source Code for Biology and Medicine vol. 10, Issue 1, Dec. 2015, 10 Pages.

"Non-Final Office Action for United States U.S. Appl. No. 16/460,853", dated Apr. 12, 2021, 6 Pages.

"Reply to Non-Final Office Action for U.S. Appl. No. 16/460,853", dated Sep. 13, 2021, 11 Pages.

"Notice of Allowance and Fees Due for United States U.S. Appl. No. 16/460,853", dated Sep. 22, 2021, 8 Pages.

"Amendment after Notice of Allowance for U.S. Appl. No. 16/460,853", dated Dec. 6, 2021, 4 Pages.

"Final Office Action Issued in U.S. Appl. No. 16/460,776", dated Mar. 9, 2022, 16 Pages.

* cited by examiner

200

```
┌─────────────────────────────────────────────────────────────────┐
│ Step 202: Represent the word sequence of a document as:         │
│                                                                 │
│              d = {w₁, ...wᵢ, ...wₙ}                             │
└─────────────────────────────────────────────────────────────────┘
```

Step 202: Represent the word sequence of a document as:

$$d = \{w_1, ... w_i, ... w_n\}$$

Step 204: Perform ELMo embedding using the local contextual information to convert each word to a vector:

$$\vec{h}_i = ELMo(\omega_i) \quad (1)$$

Step 206: Use position embedding to model the location of each word in the document content with sinusoidal position embedding:

$$\vec{pos}_i(2p) = \sin(i/10000^{2p/P}) \quad (2)$$
$$\vec{pos}_i(2p+1) = \cos(i/10000^{2p/P}) \quad (3)$$

Step 208: Use visual features $\vec{v}_i$ to represent the visual presentation of each word, including one or more of size, location, font, and DOM features.

Step 210: Perform hybrid word embedding as the concatenation of ELMo embedding, position embedding, and representation of visual features:

$$\vec{\omega}_i = \vec{h}_i \frown \vec{pos}_i \frown \vec{v}_i \quad (4)$$

GOTO Step 212 of FIG. 2B

FIG. 2A

FROM Step 210 of FIG. 2A

Step 212: Model n-grams using a convolutional transformer architecture by composing the hybrid word embeddings to n-gram embeddings using CNNs, wherein the embedding of i-th k-gram is:

$$\vec{g}_i^k = CNN^k(\vec{\omega}_{i,j} + k) \quad (5)$$

Step 214: Model the interactions between k-grams using the convolutional transformer as follows, wherein the sequence $\vec{G}^k$ is the concatenation of all k-gram embeddings:

$$\vec{c}_i^k = Transformer_i(\vec{G}^k) \quad (6)$$
$$\vec{G}^k = \vec{g}_1^k \frown \cdots \frown \vec{g}_i^k \frown \cdots \frown \vec{g}_{n-k+1}^k \quad (7)$$

Step 216: Calculate the final score of an n-gram by a feedforward layer upon the convolutional transformer, assigning key phrase scores to the word sequence's n-gram $f(w_{i:i+k}, d)$, and applying the same feedforward layer convolutional on all n-grams:

$$f(\omega_{i,i+k}, d) = softmax_{i,k}(s_i^k) \quad (8)$$
$$s_i^k = Feedforward(\vec{c}_i^k) \quad (9)$$

Step 218: Training the model as classification problem using cross entropy loss:

$$l = Cross\ Entropy(y_i^k, f(\omega_{i,i+k}, d)) \quad (10),$$

where $y_i^k$ is the label of whether the phrase $w_{i,i+k}$ is a key phrase of the document, to calculate the cross entropy loss of the final scores of the n-grams and the training labels.

FIG. 2B

Step 402: Compute the topic independent site rank, $SR(s)$:

$$SR(s_i)_{n+1} = \frac{1-d}{N} + d \sum_{s_j \in M(s_i)} SR(s_j)_n \frac{L(s_j, s_i)}{L(s_j)}$$

Step 404: Use topic independent site rank $SR(s)$ to compute topic dependent site rank $SR(s,t)$:
$SR(s,t) = SR(s) \cdot P(t|s) = SR(s) \cdot T(s,t)$

Step 406: Compute $U(s,t)$, which is the count of user clicks towards site $s$ given interest in topic $t$:
$U(s,t) = C \cdot P(s,t)$

Step 408: Compute $C(s)$, which is the count of clicks on site $s$.

Step 410: Let $U(s,t) \propto C(s)T(s,t)$.

Step 412: Calculate the final topical authority $A(s,t)$:
$A(s,t) = ST(s)C(s)T(s,t)^2$

FIG. 4

KEYPHASE EXTRACTION BEYOND LANGUAGE MODELING

RELATED APPLICATION

This application is a continuation of U.S. patent application Ser. No. 16/460,853, filed on Jul. 2, 2019, and entitled "KEYPHRASE EXTRACTION BEYOND LANGUAGE MODELING", the entirety of which is incorporated herein by reference.

BACKGROUND

Key phrases of a web page or document relate to the topic of the web page or document, Techniques for key phrase extraction (KPE) from web pages or documents have a number of applications. One such application is assessing topical authority of a website. Topical authority is the perceived authority of a website for a given topic. "Authority" may include such factors as the quality and relevance of a given website to a particular topic, how reputable the website is, the depth and breadth of expertise or knowledge presented on the website, its direct connection to particular subject matter, and the like. Automatically extracting key phrases from web pages or documents that are highly related to the topic of the web page or document is essential to high quality key phrase extraction.

Recent neural KPE methods have existed in the scientific domain, where training data is available from author-assigned key phrases, given that authors are generally in the practice of assigning key phrases to their publications. However, a key technical problem is that training a model in a narrow domain limits the model's ability to generalize well to other domains. This is because in more common scenarios most potential applications of KPE deal with a much more diverse document structure originating from a broad array of domains having content that targets a wide audience. On the World Wide Web (WWW), web pages are very often not cohesive or well-written articles, and often include various structures such as lists, media captions, and text fragments. Accordingly, modeling such web pages as a word sequence presents technical challenges.

It is with respect to these and other general considerations that embodiments have been described. Also, although relatively specific problems have been discussed, it should be understood that the embodiments should not be limited to solving the specific problems identified in the background.

BRIEF SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Embodiments described herein relate to a novel and effective key phrase extraction (KPE) system, method, program, and computer program product and provide improvements to a wide range of natural language processing and information retrieval tasks including topical authority assessment, page tagging, searching, search relevance, and others.

According to one embodiment, a system for extracting a key phrase from a document is provided. The system comprises a processor and a memory, wherein a program executing on the processor is configured to run a neural key phrase extraction model. The neural key phrase extraction model has a first layer to extract a word sequence from the document, a second layer to represent each word in the word sequence by word embedding (which may be ELMo embedding) and visual features, and a third layer to concatenate the word embedding and the visual features to produce hybrid word embeddings. A convolutional transformer models the hybrid word embeddings to n-gram embeddings, and a feedforward layer converts the n-gram embeddings into a probability distribution over a set of n-grams and calculates a key phrase score of each n-gram. The neural key phrase extraction model was trained on annotated data based on a labeled loss function to compute loss (which may be cross entropy loss) of the key phrase score of each n-gram as compared with a label from the annotated dataset. The key phrase score of each n-gram is used in a computer-implemented application.

The computer-implemented application may be an aggregation and ranking model that uses the key phrase score of each n-gram to compute an authority score $A(s,t)$ of website s given topic t.

BRIEF DESCRIPTION OF THE FIGURES (NON-LIMITING EMBODIMENTS OF THE DISCLOSURE)

Various embodiments in accordance with the present disclosure will be described with reference to the drawings, in which:

FIGS. 2A and 2B show an exemplary key phrase extraction method that can operate in conjunction with the key phrase extraction model of the present disclosure.

FIG. 4 shows an exemplary method for executing an aggregation and ranking module according to an embodiment of the present disclosure.

DETAILED DESCRIPTION

In the following detailed description, reference is made to the accompanying drawings which form a part hereof, and in which are shown by way of illustration specific embodiments. These embodiments are described in sufficient detail to enable persons having ordinary skill in the art to practice the technology, and it is to be understood that other embodiments may be utilized and that structural, logical and electrical changes may be made without departing from the spirit and scope of the disclosure. The following detailed description is therefore not to be taken in a limiting sense, and the scope is defined only by the appended claims and equivalents thereof. Like numbers in the figures refer to like components, which should be apparent from the context of use.

Aspects of the present disclosure relate to key phrase extraction (KPE) in scenarios including, for example, where documents are from diverse or unseen domains on the interact and have variant content and quality. Embodiments include technologies for extracting key phrase candidates from a corpus of documents, and also include technologies for producing topical authority ranking of webpages, documents, or sites in a given corpus to thereby enable a search engine server to systematically determine the webpages, documents, or sites that are more authoritative, or less authoritative, in the corpus. It is noted that in this application the term "sites" may include websites (such as nasa.gov), social media sites, or others. Topical authority ranking of documents or webpages may thus be done at web or internet scale.

The techniques described herein may be implemented for example as code of a search engine server or, or as a software and/or hardware system that inputs a signal into a search engine server for improving the functioning of the search engine server engine and therefore its quality. Accordingly the techniques described herein are integrated into the practical application of KPE, among others. The search engine server can be for example a web search engine server or a search engine server for searching an internal network or an intranet.

Figure 1:
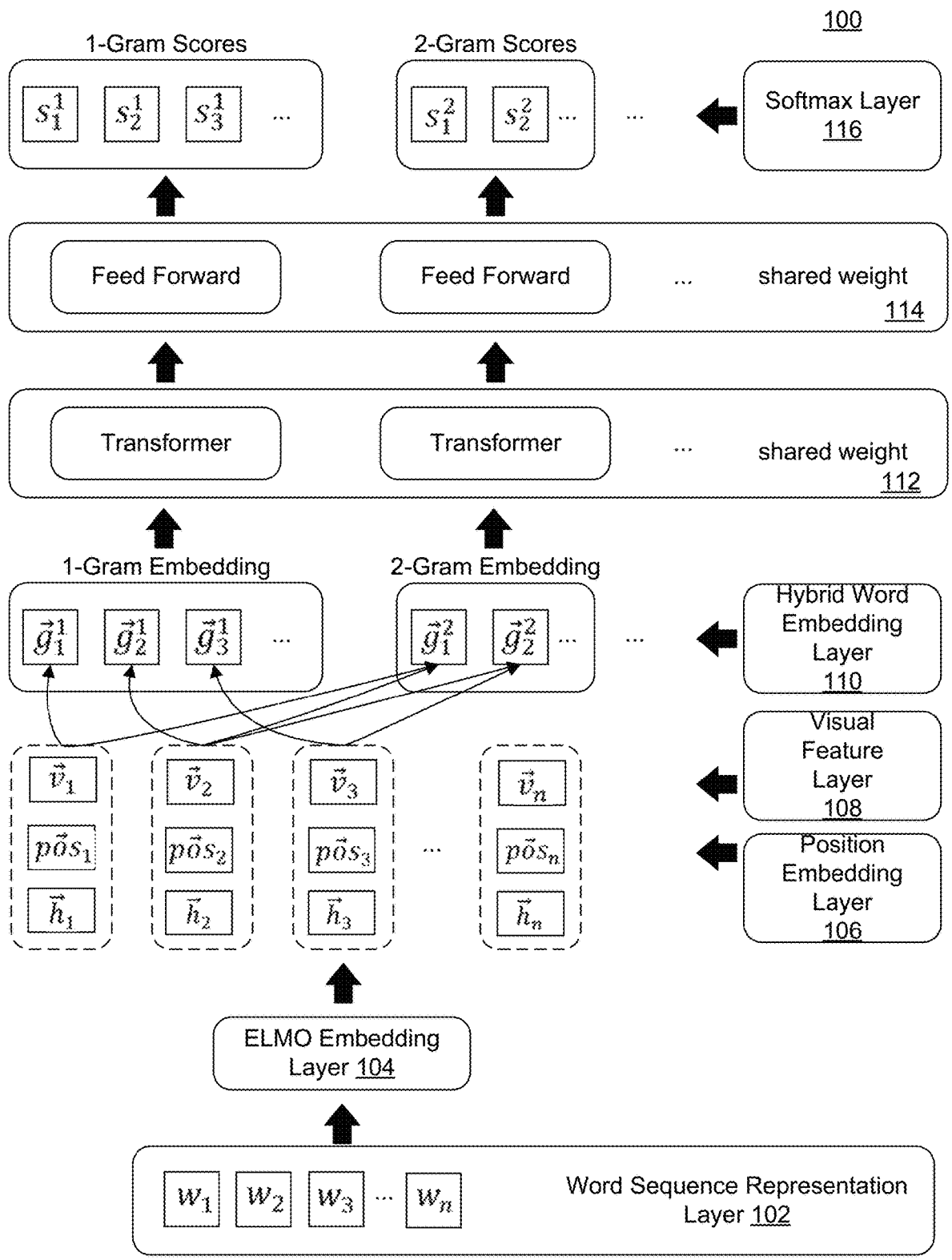
FIG. 1 illustrates a neural network architecture according to an exemplary embodiment that uses a key phrase extraction model.

FIG. 1 illustrates a network architecture according to an example embodiment of a key phrase module 100 that incorporates a neural key phrase extraction model referred to herein as "BLIND-KPE" (Beyond Language Understanding a Key-Phrase Extraction). As an overview, the key phrase module 100 of FIG. 1 is a transformer-based architecture that utilizes a key phrase extraction model to model the language properties in a document, while also going beyond language modeling by using visual presentations of documents and, preferably, weak supervision from search queries or user clicks. As an overview, the key phrase extraction model includes taking a word sequence of a document, represented as $d=\{w_1, \ldots w_i, \ldots w_n\}$, w being words, and assigning key phrase scores to the word sequence's n-gram: $f(w_{i:i+k}, d)$.

An n-gram is a contiguous sequence of n items from a given sample of text or speech. The items can be, for example, phenomes, syllables, letters, words, or base pairs, depending on the specific application involved. Such n-grams are generally collected from a text or speech corpus. In an example embodiment the items are words and the document is a web page.

An n-gram of size 1 (e.g., "President") is referred to as a unigram. An n-gram of size 2 (e.g., "United States") is referred to as a bigram or diagram. An n-gram of size 3 (e.g., "United States Congress") is referred to as a trigram. Sizes larger than trigram are often referred to by the value of n, for example, four-gram (e.g., "United States of America"), five-gram (e.g., "President of the United States"), etc. In preferred embodiments $n \leq 5$ but values of n greater than 5 are contemplated as well. In the example embodiment of BLING-KPE, the maximum document length is 256 and documents may be truncated to that length. 256 is the number of words as a unit to run the model. If the document is longer than 256 words then the model can be run multiple times.

In FIG. 1 a word sequence representation layer 102 extracts a word sequence of a document, representing a word sequence of a document as $d=\{w_1, \ldots w_i, \ldots w_n\}$, w being words. This representation can be taken over the primary content of the document.

As an example, if a document has 10 words, the word sequence representation will result in ten 1-grams; nine 2-grams; eight 3-grams; seven 4-grams; and six 5-grams, in a preferred embodiment wherein n=5. If n=5 the word sequence representation stops there but there could also theoretically be five 6-grams; four 7-grams; three 8-grams; two 9-grams; and one 10-gram.

In this embodiment an ELMo embedding layer 104 (Embedding from Language Models) represents each word in the word sequence by ELMo embedding. The ELMo embedding layer 104 performs ELMo embedding using local contextual information to convert each word into a vector:

$$\vec{h}_i = ELMo(\omega_i). \quad (1)$$

In this step a standard pre-trained ELMo can be used. As is known ELMo is a deep contextualized word representation that models complex characteristics of word use (e.g., syntax and semantics), and how these uses vary across linguistic contexts. These word vectors are learned functions of the internal states of a deep bidirectional language model (biLM), which is pre-trained on a large text corpus. In a preferred embodiment ELMo converts each word to a 256-dimension vector. Of course, while ELMo embedding is used in this embodiment, other forms of word embedding known in the art could be used as well, such as Bidirectional Encoder Representations from Transformers (BERT).

The key phrase module 100 of this embodiment also includes a position embedding layer 106 that represents each word in the word sequence by position embedding. The position embedding layer 106 uses position embedding to model the location of each word in the document content. The relative position of the word on the page is considered because it is found that useful information often occurs earlier in the page. One suitable technique for position embedding, among others, is standard sinusoidal position embedding:

$$\vec{pos}_i(2p) = \sin(i/10000^{2p/P}). \quad (2)$$

$$\vec{pos}_i(2p+1) = \cos(i.10000^{2p/P}). \quad (3)$$

In these equations the p-th dimension of the position embedding is a function of its position (i) and dimension (p). Of course, in other embodiments other forms of position embedding known in the art could be used as well. It is also noted that while a preferred. embodiment includes the position embedding layer 106, position embedding is optional and the position embedding layer 106 can be dropped from the key phrase module 100 without too much regression.

The key phrase module 100 further includes a visual feature layer 108 that represents each word in the word sequence by visual features; i.e., the visual feature layer 108 uses visual features to represent the visual presentation of each word. By virtue of extracting key phrases with visual features from the document, words that are more prominently featured in the document, such as by larger font or in bold, for example, are estimated as being salient. Here the visual features are denoted as $\vec{v}_i$. According to an example embodiment, one or more of the following groups of visual features are extracted for each word or text piece in the document: (1) size features include the height and width of the text block a word appears in; (2) location features include the two-dimensional (2D) location of the word in the document; (3) font features include the font size and whether the word is in, e.g., bold, italics, etc.; (4) Hypertext Markup Language (HTML) structural features, e.g., Document Object Model (DOM) features that include whether the word appears in "inline" or "block" HTML tags, whether the word is in a leaf node of the DOM tree, etc.

Of course, embodiments are not limited to the above-noted features. An example of a fuller feature set is listed below in Table 1. The present disclosure doubles the features by including the same features from the word's parent block in the DOM tree:

TABLE 1

Visual Features

| Name | Dimension |
| --- | --- |
| Font Size | 1 × 2 |
| Text Block Size | 2 × 2 |
| Location | 2 × 2 |
| Is Bold | 1 × 2 |
| In Inline | 1 × 2 |
| In Block | 1 × 2 |
| In DOM Leaf | 1 × 2 |

In Table 1, all features are extracted at the per-word level and at the parent block level, i.e., the parent node of the word in the HTML DOM tree).

A hybrid word embedding layer 110 concatenates the ELMo or word embedding, the position embedding (if present), and the visual features to produce hybrid word embeddings. The hybrid word embedding is performed using the following equation (4).

$$\vec{w}_i = \vec{h}_i \frown \vec{pos} \frown \vec{v}_i \qquad (4)$$

The key phrase module 100 uses a convolutional transformer architecture 112 to model the hybrid word embeddings to n-gram embeddings, thereby modeling n-grams and their interactions. in one embodiment the key phrase module 100 composes the hybrid word embeddings to n-gram embeddings using Convolutional Neural Networks (CANs). The result is a combination of the word embeddings of the corresponding n-gram. The embedding of the i-th k-gram is calculated as follows:

$$\vec{g}_i^k = CNN^k(\vec{\omega}_{i:i+k}) \qquad (5)$$

In this equation k is the length of the n-gram, and $1 \leq k \leq K$. K is the maximum length of allowed candidate n-grams. Each k-gram has its own set of convolutional filters $CNN^k$ with window size k and stride 1. In a preferred embodiment the maximum n-gram length is set to five (K=5).

The interactions between k-grams are modeled using the convolutional transformer 112 as follows:

$$\vec{t}_i^k = Transformer_i(\vec{G}^k), \qquad (6)$$

$$\vec{G}^k = \vec{g}_1^k \frown \ldots \frown \vec{g}_i^k \ldots \frown \vec{g}_{n-k+1}^k \qquad (7)$$

The sequence $\vec{G}^k$ is the concatenation of all k-gram embeddings. The transformer 112 models the self-attentions between k-grams and fuses them to global contextualized embeddings. Thus the transformer 112 models the attentions in the embedding space.

The transformer 112 is convolutional on all length k of n-grams. The same parameters are used to model the interactions between n-grams at each length, to reduce the parameter size. The technique of this embodiment recognizes that the interactions between bi-grams and the interactions between tri-grams are not significantly different.

A feedforward layer 114 converts the n-gram embeddings into a probability distribution over a set of n-grams, ideally all possible n-grams, and calculates a key phrase score, which may be a final key phrase score, of each n-gram. The score characterizes the importance of a particular n-gram according to the model. In particular, key phrase scores are assigned to the word sequence's n-gram as: $f(w_{i:i+k}, d)$. Like the convolutional transformer 112, the same feedforward layer 114 is applied convolutional on all n-grams:

$$f(\omega_{i:i+k}, d) = softmax_{i,k}(s_i^k) \qquad (8)$$

$$s_i^k = Feedforward(\vec{t}_i^k) \qquad (9)$$

A softmax layer 116 takes the softmax over a set of n-grams, ideally all possible n-grams, at each position i and each length k. The model decides the span location and length jointly.

The key phrase module 100 uses a neural key phrase extraction model that was trained on annotated data based on a labeled loss function to compute loss of the key phrase score of each n-gram as compared with a label from the annotated dataset. For example according to one embodiment the model is trained as a classification problem using cross entropy loss:

$$l = Cross\ Entropy(y_i^k, f(\omega_{i:i+k}, d)) \qquad (10)$$

where $y_i^k$ is the label of whether the phrase $w_{i:i+k}$ is a key phrase of the document. It is to be noted that cross entropy is one of a number of suitable loss functions that can be used in classification tasks. Other suitable loss functions include hinge loss, Kullback-Leibler (KL) divergence, Mean Square Error, and Mean Absolute Error.

The model according to this example embodiment performs multiclass classification with the softmax function and cross-entropy loss function. For multiclass classification the softmax function is used in multinomial logistic regression. In the present model each class corresponds to an n-gram. The logistic output function can only be used for the classification between two target classes, t=1 and t=0. This logistic function can be generalized to output a multiclass categorical probability distribution by the softmax function. The softmax function takes an N-dimensional vector of real numbers and transforms it into a vector of real numbers in the range of (0,1) which add up to 1. A softmax function is a "soft" version of max function: instead of selecting one maximum value, it breaks the whole (1) with the maximal element getting the largest portion of the distribution but with other smaller elements getting some of it as well. The property of the softmax function, that it outputs a probability distribution, makes it suitable for probabilistic interpretation in classification tasks.

Cross entropy indicates the distance between what the model believes the output distribution should be and what the original distribution actually is. A cross entropy measure is used when node activations can be understood as representing the probability that each hypothesis might be true, i.e., when the output is a probability distribution. Thus it is used as a loss function in neural networks which have softmax activations in the output layer. Accordingly, cross-entropy loss measures the performance of a classification model which has an output that is a probability value between 0 and 1. Cross-entropy loss increases as the predicted probability diverges from the actual label. A perfect model would have a log loss of 0.

In the key phrase module 100, Equation (8) and Equation (9) convert into a probability distribution between 0 and 1. Equation (10) computes the cross entropy of the probability distribution and the training label, which is the true probability distribution, For the training labels a dataset such as OpenKP is used, (Training is discussed further below in connection with OpenKP.) Thus, Equation (10) computes the softmax cross entropy loss of the model prediction vs. the true labels from the dataset. The model prediction is from FIG. 1, i.e., 1-gram scores. 2-gram scores, etc., as per the softmax layer 116. The key phrase score of each n-gram may be used in a computer-implemented application including but not limited to topical authority assessment (such as computing an authority score of a particular website given a particular topic), ordering and presenting quality and authoritative web search results through a web search engine, page tagging, searching, search relevance, and other practical applications.

FIGS. 2A and 2B comprise a flowchart showing the steps of a key phrase extraction method 200 that can operate in conjunction with the key phrase module 100.

In the hybrid word embedding aspect of the model, each word is represented by its word embedding, position embedding, and visual features, as follows.

In step 202 a word sequence of a document is extracted, representing a word sequence of a document as $d=\{w_1, \ldots w_i, \ldots w_n\}$. w being words. This representation can be taken over the primary content of the document. Step 202 can be performed by the word sequence representation layer 102 of the key phrase extraction module shown in FIG. 1.

In step 204 each word in the word sequence is represented by ELMo embedding. ELMo embedding can be performed by the ELMo embedding layer 104. ELMo embedding is performed using local contextual information to convert each word into a vector:

$$\vec{h}_i = ELMo(\omega_i). \tag{1}$$

In step 204 a standard pre-trained ELMo can be used. Of course, while ELMo embedding is used in this embodiment, other forms of word embedding known in the art could be used as well, such as Bidirectional Encoder Representations from Transformers (BERT).

In step 206 each word in the word sequence is represented by position embedding to model the location of each word in the document content. The relative position on the page is considered because it is found that useful information often occurs early in the page. Step 206 can be performed by the position embedding layer 106. One suitable technique for this is standard sinusoidal position embedding:

$$\vec{pos}_i(2p) = \sin(i/10000^{2p/P}). \tag{2}$$

$$\vec{pos}_i(2p+1) = \cos(i/10000^{2p/P}). \tag{3}$$

In these equations the p-th dimension of the position embedding is a function of its position (i) and dimension (p). Of course, in other embodiments other forms of position embedding known in the art could be used as well. It is also noted that while a preferred embodiment includes the position embedding step 206, position embedding is optional and the position embedding step 206 can be dropped from the key phrase extraction method 200 without too much regression.

In step 208 each word in the word sequence is represented by visual features, i.e., visual features are used to represent the visual presentation of each word. Step 208 can be performed by the visual feature layer 108. By virtue of extracting key phrases with visual features from the document, words that are more prominently featured in the document, such as by larger font or in bold, for example, are estimated as being salient. Here the visual features are denoted as $\vec{v}_i$. As noted above, according to an example embodiment, one or more of the following four groups of visual features are extracted for each word in the document: (1) size features include the height and width of the text block a word appears in; (2) location features include the two-dimensional (2D) location of the word in the document; (3) font features include the font size and whether the word is in, bold, italics, etc.; (4) HTML structural features, e.g., DOM features that include whether the word appears in "inline" or "block" HTML tags, whether the word is in a leaf node of the DOM tree, etc. Of course, embodiments are not limited to the above-noted features.

In step 210 the ELMo or word embedding, the position embedding (if present), and the visual features are concatenated to produce hybrid word embeddings. Step 210 can be performed by the hybrid word embedding layer 110. Hybrid word embedding is performed per equation (4):

$$\vec{\omega}_i = \vec{h}_i \frown \vec{pos}_i \frown \vec{v}_i \tag{4}$$

In step 212 the hybrid word embeddings are modeled to n-gram embeddings using, e.g., Convolutional Neural Networks (CNNs). Step 212 can be performed by the convolutional transformer architecture 112, which models n-grams and their interactions. The result is a combination of the word embeddings of the corresponding n-grain. The embedding of the i-th k-gram is calculated as follows:

$$\vec{g}_i^k = CNN^k(\vec{\omega}_{i:i+k}) \tag{5}$$

In this equation k is the length of the n-gram, and $1 \leq k \leq K$. K is the maximum length of allowed candidate n-grams: Each k-gram has its own set of convolutional filters $CNN^k$ with window size k and stride 1. In a preferred embodiment the maximum n-gram length is set to five (K=5).

In step 214 the interactions between k-grams are modeled. Step 214 can be performed using the convolutional transformer 112 as follows:

$$\vec{t}_i^k = Transformer_i(\vec{G}^k), \tag{6}$$

$$\vec{G}^k = \vec{g}_1^k \frown \ldots \frown \vec{g}_i^k \ldots \frown \vec{g}_{n-k+1}^k \tag{7}$$

The sequence $\vec{G}^k$ is the concatenation of all k-gram embeddings. The transformer 112 models the self-attentions between k-grams and fuses them to global contextualized embeddings. Thus the transformer 112 models the attentions in the embedding space.

In step 216 the n-gram embeddings are converted into a probability distribution over a set of n-grams, ideally all possible n-grams, and a key phrase score is calculated, which may be a final key phrase score, of each n-gram. Step 216 can be performed by the feedforward layer 114. The score characterizes the importance of a particular n-gram according to the model. In particular, key phrase scores are assigned to the word sequence's n-gram as: $f(w_{i:i+k}, d)$. Like the convolutional transformer 112, the same feedforward layer 114 is applied (convolutional) on all n-grams:

$$f(\omega_{i:i+k}, d) = \text{softmax}_{i,k}(s_i^k) \tag{8}$$

$$s_i^k = Feedforward(\vec{t}_i^k) \tag{9}$$

A softmax layer 116 takes the softmax over a set of n-grams, ideally all possible n-grams, at each position i and each length k. The model decides the span location and length jointly.

Learning

In step 218 the neural key phrase extraction model is trained on annotated data based on a labeled loss function to compute loss of the key phrase score of each n-gram as compared with a label from the annotated dataset. For example according to one embodiment the model is trained as a classification problem using cross entropy loss:

$$l = \text{Cross Entropy}(y_i^k, f(\omega_{i:i+k}, d)) \tag{10}$$

where $y_i^k$ is the label of whether the phrase $w_{i:i+k}$ is a key phrase of the document. Again it is to be noted that cross entropy is one of a number of suitable loss functions that can be used in classification tasks.

In the key phrase extraction model of this example embodiment, Equation (8) and Equation (9) convert into a probability distribution between 0 and 1. Equation (10) computes the cross entropy of the probability distribution and the training label, which is the true probability distribution. For the training labels a dataset such as OpenKP is used. (Training is discussed further below in connection with OpenKP.) Thus, Equation (10) computes the softmax cross entropy loss of the model prediction vs. the true labels from the dataset. The model prediction is from FIG. 1, i.e., 1-gram scores, 2-gram scores, etc., as per the softmax layer 116. The key phrase score of each n-gram may be used in a computer-implemented application including but not limited to topical authority assessment (such as computing an authority score of a particular website given a particular topic), ordering and presenting quality and authoritative web search results through a web search engine page tagging, searching, search relevance, and others.

In this way the key phrase extraction model is trained on annotated data based on a labeled loss function to compute cross entropy loss of the final key phrase score of each n-gram compared to a label from the annotated dataset.

Pre-Training using Weak Supervision from Search Queries

In one embodiment the key phrase extraction model used by the key phrase module 100 is pre-trained using weak supervision from search queries or search clicks. One application of key phrases is information retrieval. One purpose of extracting key phrases is to capture the topic(s) of the document. As such the extracted key phrases can provide high quality document indexing terms or new semantic ranking features. Looking at it from the reverse direction, then, user clicks convey a user's perception of the document during search and therefore can provide significant feedback signals for document understanding. Accordingly, in one embodiment weak supervision from search clicks is formulated as a pre-training task referred to herein as "Query Prediction." In Query Prediction the model is pre-trained to predict which phrase in the document has been used as a "click query," i.e., a query that a user issued to search and click on the document. Thus Query Prediction treats a click query as a key phrase to be used in key phrase extraction. As click queries on a document reflect a user's perceptions of relevance and importance when searching the document they can therefore be considered to be "pseudo key phrases." Pre-training on this weak supervision can utilize a large amount of pre-training signals available at scale in search systems including commercial search logs.

In this way the key phrase module 100 according to an example embodiment leverages user feedback signals as weak supervision, such that search queries from users are used as a dataset. In particular, given document d, the key phrase module 100 learns from its click queries $Q = \{q_1, \ldots, q_m\}$. This pre-training step uses the same cross entropy loss:

$$l_{pre} = \text{Cross Entropy}(y_i', f(q_i, d)) \quad (11)$$

In this equation $y_i'$ indicates whether the query $q_i$ is a click query and also appears as an n-gram in the document d.

A Query Prediction pre-training dataset can be created or accessed and then utilized as the pre-training dataset. For example, an example dataset can be created by sampling data from a search log of a commercial search engine during a given interval (e.g., one week) wherein navigational and offensive inquiries are filtered out. Preferably only the click queries that are included as an n-gram in the document are kept. By virtue of the features described herein, the key phrase extraction model can preferably be pre-trained using weak supervision from search queries based on whether a click query also appears as an n-gram in a document.

Training the Key Phrase Extraction Model

As noted above, the key phrase extraction model is trained on annotated data based on a labeled loss function to compute loss of the key phrase score of each n-gram as compared with a label from the annotated dataset. In one embodiment this step involves training on a large scale open domain key phrase extraction dataset that has been manually labeled. The dataset provides a series of word sequences, each word sequence being labeled with a key phrase or topic that appears in the word sequence. One example of such manually labeled dataset is referred to herein as "OpenKP," a dataset that includes tens of thousands or more web documents that have been manually labeled with key phrase annotations. The web documents are randomly sampled from a large web corpus and reflect the characteristics of typical web pages, with a large amount of variation in their domains and content quality. As an example, a training dataset such as OpenKP can contain a web page providing information about an actor in which labeled as key phrases are both the actor's name and the name of a character the actor plays in a movie. OpenKP represents the first publicly available open domain key phrase extraction dataset with annotations at this scale. By virtue of learning from open domain data, compared to data of a specific domain, the key phrase extraction model can generalize well to a broader array of domains.

Of course, OpenKP is just an example training dataset and other training datasets can be created or accessed and then utilized as the training dataset with the techniques disclosed herein. A training dataset similar to OpenKP can be created using the same basic principles that were used to create OpenKP. The documents in OpenKP were sampled from the index of a commercial search engine. The sampling was conducted on the pool of pages seen by United State users during a time period spanning 2-3 months. There was little to no restriction on the domain or type of the documents. The documents are content-oriented pages such as news articles, multi-media pages from video sites, indexing pages with many hyperlinks, and others. OpenKP is designed to reflect the diverse properties of web documents on the Internet.

A method of creating OpenKP or a similar dataset according to one example aspect includes generating key phrase labels. Key phrase labels can be generated by rendering and examining a web page and manually labeling a number of key phrases (e.g., 1-3 key phrases or more) using criteria such as the following: (1) salience: a key phrase captures essential meaning of the page with no ambiguity; (2) extraction: the key phrase must appear in the document; (3) fine-grained: the key phrase cannot be a general topic or a topic that is too abstract, such as "Sports" or "Politics"; correct and succinct: the key phrase must form a correct noun phrase, while it also should not be clauses or sentences.

Settling on an appropriate amount of training data points requires a cost-benefit analysis. A larger amount of training data points can reduce missing positives and therefore can be more effective than using smaller data with slightly better labels when training neural models; however, the amount of training data points should not be too large (selecting three key phrases as labels as in OpenKP may be preferable). It is noted that a training dataset as created does not have to be perfect to work well and indeed different page annotators can arrive at different manual labels. Substantial overlap should exist when measured over many pages but achieving perfect manual labels for all pages in the dataset is not feasible or required. The dataset should consist of reasonable choices for key phrases as manual labels.

Figure 1A:
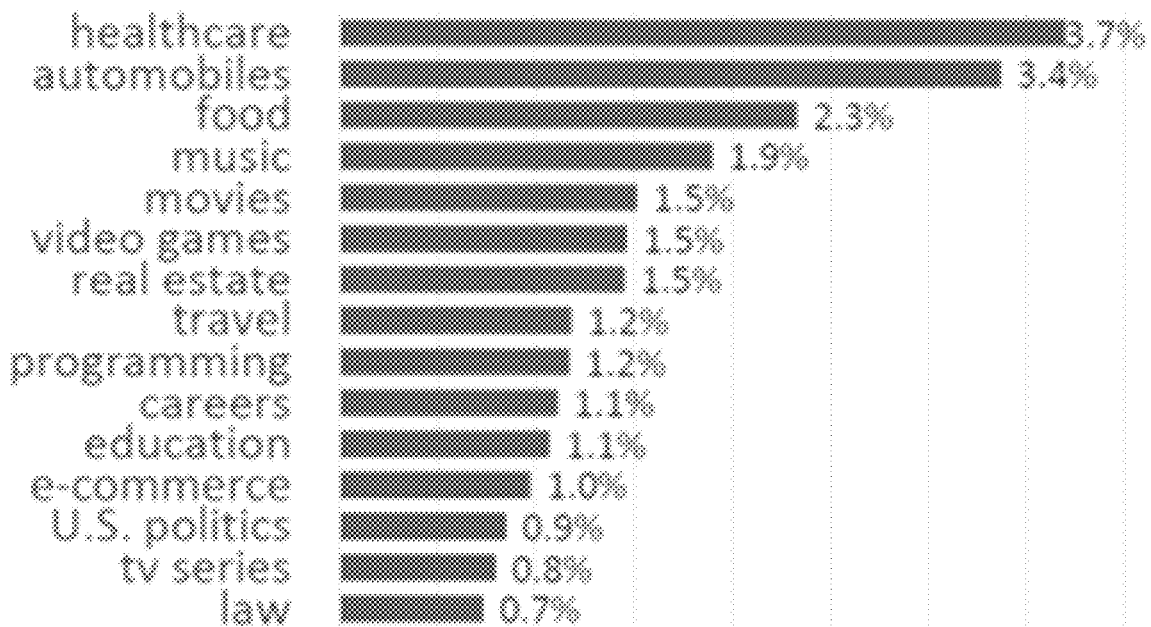
FIG. 1A depicts an example of the OpenKP dataset.

Table 1, illustrated in FIG. 1A, shows an example of the OpenKP dataset, and depicts the 15 most popular topics in OpenKP. In this example OpenKP documents were classified into 5,000 predefined domains. The top 15 most popular classes and their distributions are shown in Table 1. As expected, these documents have large variation in their topic domains. The most popular domain, "healthcare," only covers 3.7% of documents; the tenth most popular topic only covers 1% of documents. Moreover, the top 15 classes make up less than 25% of the entire dataset thereby showing how domain diverse the OpenKP dataset is.

Table 2 lists some of the specifications of OpenKP. In Table 3 the document length is the length of the text parsed from HTML of the web page using a production HTML parser. These statistics reflect the large variations in the document contents; their length varies significantly and they share few common key phrases, as shown by the large number of unique key phrases.

TABLE 2

Statistics of OpenKP

| Statistics | Mean | STD |
| --- | --- | --- |
| Doc Length | 900.4 | 1494.4 |
| # of KPs per Doc | 1.8 | 0.8 |
| Keyphrase Length | 2.7 | 0.85 |
| Doc Vocabulary Size | 1.5M | n.a. |
| KP Vocabulary Size | 62.1K | n.a. |
| # of Documents | 68K | n.a. |
| # of Unique KPs | 99.6K | n.a. |

Using the Key Phrase Module to Produce Topical Authority Ranking at Web Scale

The present disclosure according to another aspect is a system for using the KPE module 100 of FIG. 1 and the method of FIGS. 2A and 2B to produce topical authority ranking at web or internet scale. Practical applications of topical authority include, for example, ordering and presenting the results of search engines, or for the process where a series of text snippets are displayed in relation to search terms, each text snippet followed by a link to the source. The techniques described herein can also be used for supplying by a search engine personalized news and blogs (for example on a mobile app) in the form of an infinite scroll down.

The notion of perceived authority is closely connected to topics. Consider as an example several sites for the topic "American Museum of Natural History." At one end of the spectrum there is amnh.org that, the most authoritative site for "American Museum of Natural History." At the other end of the spectrum there are sites such as heart.org (i.e., the American Heart Association's site) that are authoritative in other topics (here, heart topics) but irrelevant to "American Museum of Natural History." Somewhere in between, there are sites that cover the "American Museum of Natural History" topic with reasonable quality, such as wikipedia.org.

An aspect of this disclosure includes finding the site level (i.e., domain, host level) topical authority as per Definition 1 below. It is noted that working at site level as opposed to webpage level can reduce the damage from model errors introduced by any single page.

Definition 1. Topical authority A(s,t) measures the authority score of site s given topic t.

Consider an example of ranking the American Museum of Natural History in New York. An ideal topical authority model should rank:

A(amnh.org, American Museum of Natural History)>A (wikipedia.org, American Museum of Natural History).

A(wikipedia.org, American Museum of Natural History)>A(espn.com, American Museum of Natural History).

Embodiments comprise a general model that computes A (s,t) such that A(s,t) aligns with the perceived authoritativeness on any given topic among all relevant sites. By virtue of the features of the system described herein search engine quality can be improved, and in particular the trustworthiness of web search results, for example, can be improved.

Figure 3:
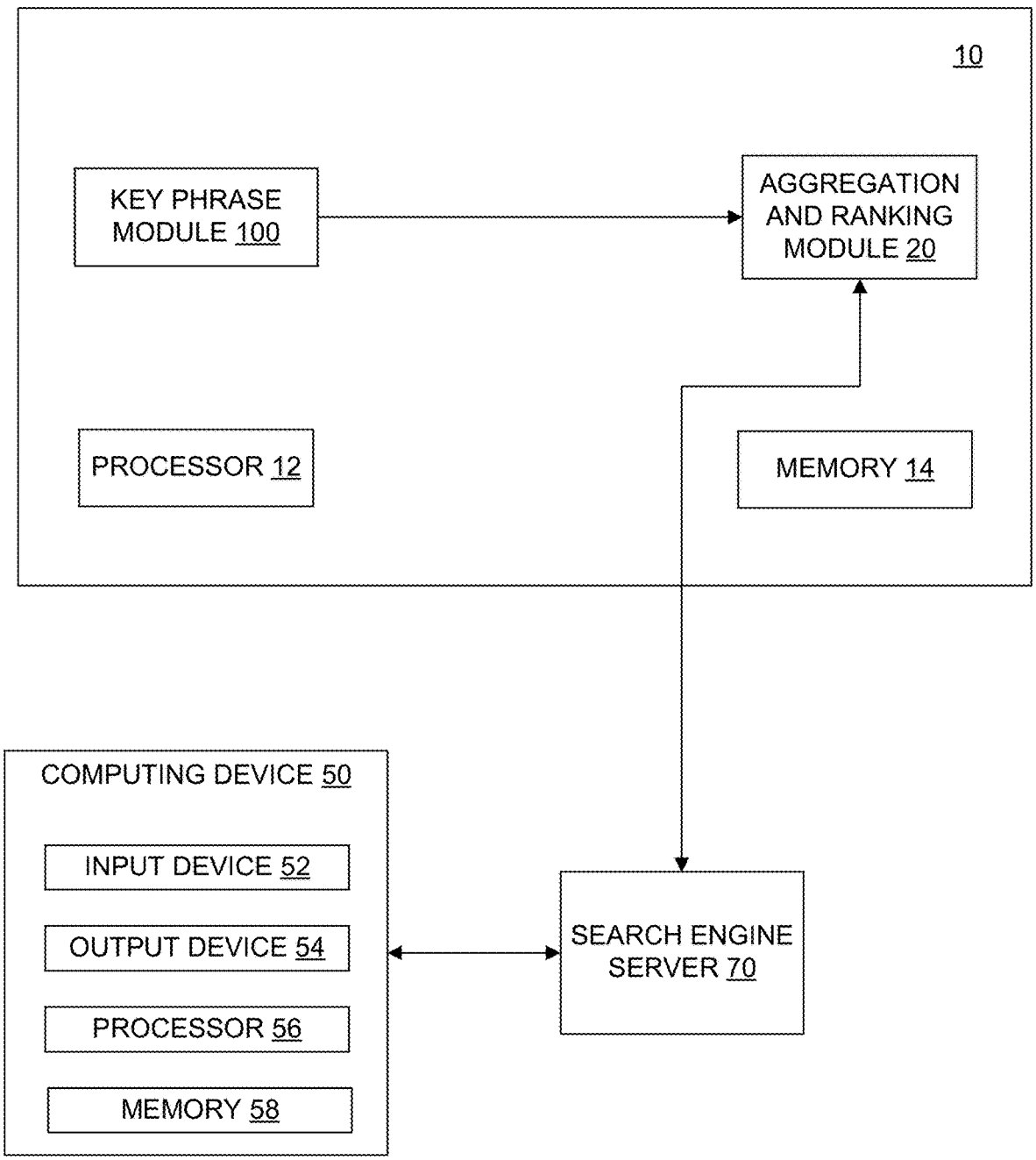
FIG. 3 shows a schematic representation of a system for producing topical authority ranking at internet scale according to an exemplary embodiment of the present disclosure.

FIG. 3 shows a schematic representation of a system for producing topical authority ranking according to an embodiment of the present disclosure. The system includes a topical authority ranking (TAR) server or platform 10 that outputs a signal to a search engine server 70. Embodiments of the TAR platform 10 can also be incorporated into a search engine via hardware or software or a combination thereof. The search engine server 70 can be for example a web search engine server or a search engine server for searching an internal network or an intranet.

The search engine server 70 communicates with a computing device 50. The computing device 50 can be a user device requesting search results and includes an input device 52 and an output device 54. The input device 52 allows a user to input data through text, speech, audio, or video and may include one or more of a microphone, a keyboard, a camera, and a touchscreen (not shown). The output device 54 may include one or more of a display and a speaker (not shown). The computing device 50 also includes a processor 56 and a memory 58 and may be, for example, a laptop computer, a smartphone, a tablet, a desktop computer, a headless device, or others.

The TAR platform 10 has a processor 12 and a memory 14 and executes a key phrase module 100 and an aggregation and ranking module 20.

As noted above the key phrase model of this aspect can be the key phrase module 100 of FIG. 1, as shown in FIG. 3, using the method of FIGS. 2A and 2B.

Referring again to FIG. 2B, as described above, in step 216 a key phrase score for each n-gram (which may be a final key phrase score) is produced, i.e., 1-gram scores, 2-gram scores, etc. Each score is a topic or key phrase. This topic candidate scoring is also designated herein as a site topic purity factor T(s, t):

Definition 2. T(s, t) ε [0, 1] is the percentage of pages within a site s that are tagged with topic t.

This topic purity factor T(s, t) is a component in later authority computation and can be used by the aggregation and ranking module 20 of FIG. 3.

The aggregation and ranking module 20 is a hybrid authority ranking model that is used to compute topic-site-level authority scores. This model takes site level PageRank topic features and other site features as inputs and produces site topical authority ranking.

The aggregation and ranking module 20 of embodiments is a topical authority solution that can be applied to the massive and heterogeneous Internet across a great many extracted topics. FIG. 4 shows an exemplary method 400 for executing the aggregation and ranking module 20 according to an embodiment.

As an overall description of the method of FIG. 4, website authoritativeness A(s,t) is approximated as a function of popularity and site level topical purity as in Definition 3 below. The aggregation and ranking module 20 considers both the site's PageRank and the site's clicks as primary popularity signals. These two signals are susceptible to different types of spam attacks such as link farms and clickbait. Combining the two signals provides a more robust estimate of a site's popularity and quality. However, popularity and quality alone are not sufficient to reflect quality topical authoritativeness. For instance, a website for a search engine may be more popular than amnh.org as a site, amnh.org is far more authoritative on the "American Museum of Natural History" topic.

To overcome this drawback, the aggregation and ranking module 20 incorporates a topical dimension into the equation. Instead of merely accessing PageRank of a site s, or site rank SR(s), the aggregation and ranking module 20 measures site rank of a site on a topic SR(s,t). Similarly, for user clicks on a site U(s), the aggregation and ranking module 20 computes U(s,t), a metric that measures the count of user clicks towards a site s given that the user is interested in topic t. Topical authority is defined in Definition 3 by combining these two factors.

Definition 3. A(s,t)=Φ(SR(s,t), U(s,t)), where A(s,t) is website authoritativeness, SR(s,t) is a measure of site rank of a site on a topic, U(s,t) is a measure of user clicks towards a site s given that the user is interested in topic t, and Φ is the final combiner function which can be empirically tuned or machine learned.

The aggregation and ranking module 20 adapts PageRank to run on a graph where each node is a site, to compute a topic independent site rank. The intra-site links are dropped and links between sites are directed and weighted by the number of links from all pages in the source site pointing to the destination site. This site level graph allows the aggregation and ranking module 20 to compute in Step 402 the topic independent site rank, SR(s) as follows:

$$SR(s_i)_{n+1} = \frac{1-d}{N} + d \sum_{s_j \in M(s_i)} SR(s_j)_n \frac{L(s_j, s_i)}{L(s_j)} \quad (12)$$

In this equation, d is the damping factor and N is the number of sites in the graph. M($s_i$) is the set of sites that link to $s_i$. L($s_j$,$s_i$) is the count of links from pages in $s_j$ to pages in $s_i$, and L($s_j$) denotes the count of total inter-site out-links from pages in $s_j$. Also, n is number of iterations in site rank propagation.

In Step 404 the topic dependent site rank SR(s,t) is calculated, using the topic independent site rank SR(s) from Equation (12). The topic dependent site rank SR(s,t) may perform best when it is defined as in Equation (13):

$$SR(s,t)=SR(s) \cdot P(t|s)=SR(s) \cdot T(s,t) \quad (13)$$

PageRank estimates the probability of a user visit onto a node via hyperlinks. P(t|s), in contrast, measures the probability of a user interested in t given that she visited a page on sites, Under Assumption A1, all webpages within the same site are equally likely to receive clicks. Using this assumption the aggregation and ranking module 20 can compute P(s|t)=T(s,t). it will be recalled that T(s,t), the topic purity factor, is the percentage of pages within the site s that are tagged with topic t. T(s,t) was defined above in Definition 2 as T(s,t) ε [0, 1], and was calculated by the key phrase module 100 in step 216 of FIG. 2B which produced a final key phrase score for each n-gram which is used as T(s,t).

The aggregation and ranking module 20 weights the final score with topic purity after site rank has converged. It is noted that Assumption A1 is not strictly true across the internet and therefore is not necessarily an ideal assumption. Nevertheless embodiments can overcome problems arising in tail topics, which a topics mentioned by relatively few pages on the internet.

In Step 406 U(s,t)) is derived. As noted above, U(s,t) measures the count of user clicks towards a site s given that the user is interested in topic t. U(s,t)=C·P(s,t), where C denotes the total user click traffic on the internet and P(s,t) is the probability of users interested in topic t and clicked onto sites. Since C is a constant across all sites and topics, computing the ranking of U(s,t) essentially comes down to finding P(s,t):

$$\text{Let } U(s,t) \propto P(s,t)=P(s)P(t|s) \quad (14)$$

Here P(s) is the probability of a user click on site s, which is proportional to the count of clicks on site s. This click count is denoted as C(s), which is calculated in Step 408. One way to measure C(s) is to leverage Bing's anonymized traffic log to measure C(s) over an arbitrary period of time.

P(t|s) measures the probability of a click on a page tagged with topic t given that it occurred on site s. Under the same Assumption AI (all webpages within the same site are equally likely to receive clicks), P(t|s) is equivalent to T(s,t).

In Step 410 let $$U(s,t) \propto C(s)T(s,t) \quad (15)$$

Equation (13) and Equation (15) together produce the final topical authority A(s,t) defined in Equation (17).

The combination function Φ dictates how the system leverages clicks, site rank, and topic purity signals to produce the final topical authority A(s,t):

$$A(s,t)=\Phi(SR(s)T(s,t),C(s)T(s,t)) \quad (16)$$

The baseline analytical model set out below in Eq. (17) and calculated in Step 412 is the product of the major topical authority factors. The factors are combined with equal importance and are therefore agnostic to the magnitude of their values during ranking:

$$A(s,t)=SR(s)C(s)T(s,t)^2 \quad (17)$$

There are other variations beyond the baseline. An improved analytical solution Eq. (18) can increase model accuracy. The method is to give a promotion to larger sites and to sites where the topic model is more confident that their pages are related to topic t.

$$A(s,t)=SR(s)C(s)T(s,t)^2 \cdot \log(\# \text{ of pages in } s) \quad (18)$$

·Avg ($b_t$ for pages tagged with t in s)

Returning again to FIG. 3, the output from the aggregation and ranking module 20 of the TAR platform 10, i.e., the final topical authority A(s,t), feeds in to the search engine server 70. As noted above, alternatively the key-phrase model and the aggregation and ranking model can be incorporated into a search engine server. These models can run on one or more computers depending on how big the corpus is, with a scheduler if desired to direct the machines how often to run the models. Embodiments can be incorporated into a web search engine via hardware or software or a combination thereof. With the input into the web engine server the search engine server can learn and use the input and train the input in producing its search results.

Example Implementations

The techniques disclosed herein are optimized for the deep learning and neural network environment on a computer network in contrast with previous computerized systems. The techniques disclosed herein with respect to the key phrase module 100 and the aggregation and ranking module 20 may be implemented for example as code of a search engine or as a software and/or hardware system that feeds a signal into a search engine for improving the functioning of a search engine and therefore its quality. Accordingly the techniques described herein are, in one aspect, integrated into the practical application of key phrase extraction. In another aspect the techniques described herein are integrated into the practical application of ordering and presenting quality and authoritative search results through a search engine including, but not limited to, a web search engine. Other practical applications are contemplated as well.

Figure 5:
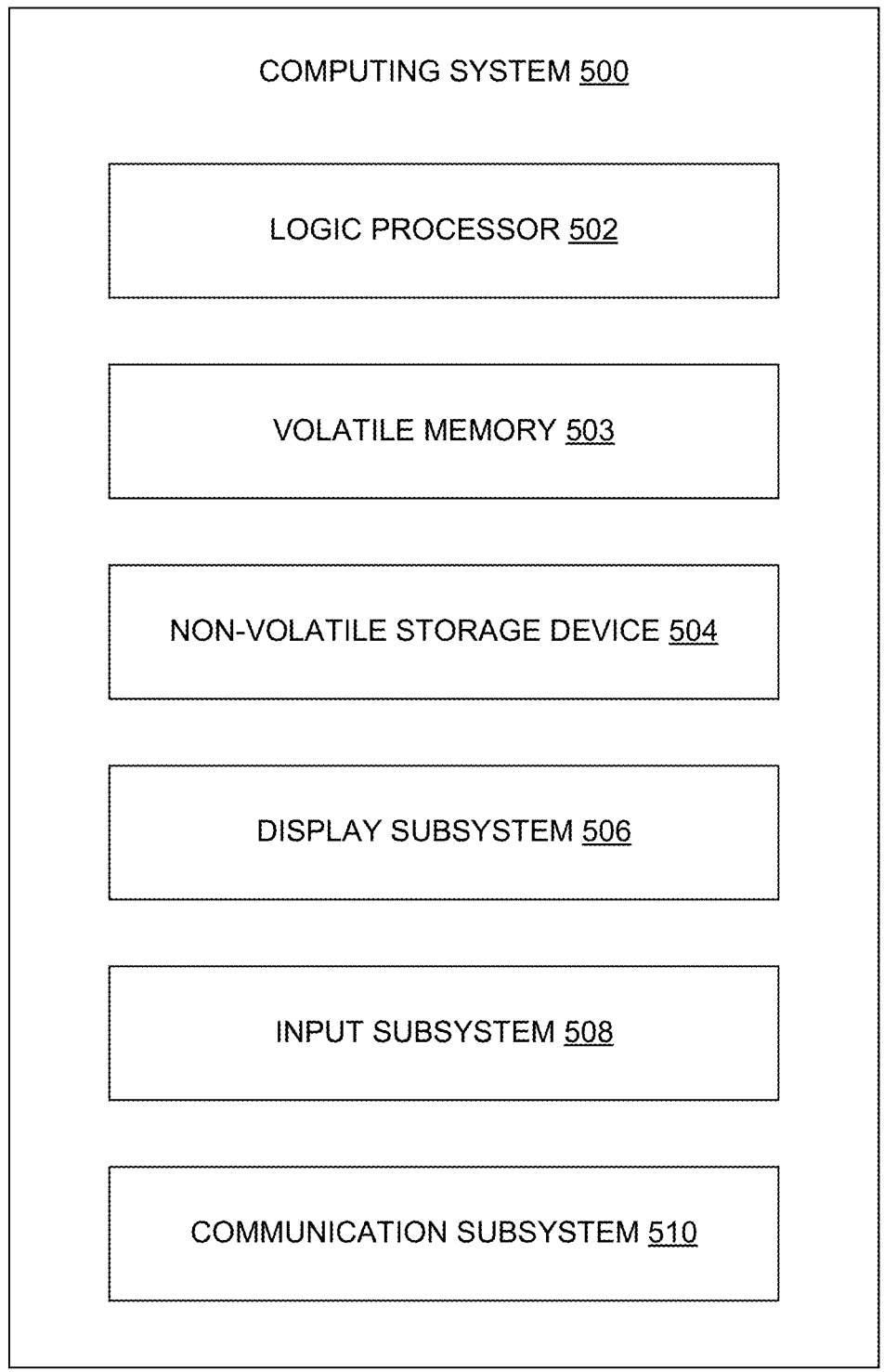
FIG. 5 illustrates an exemplary block diagram of a computer system in which embodiments may be implemented.

FIG. 5 schematically shows a non-limiting embodiment of a computing system 500 that can enact one or more of the methods and processes described above. Computing system 500 is shown in simplified form. Computing system 500 may embody one or more of the key phrase extraction module 100, the aggregation and ranking module 20, and the TAR platform 10, among other elements shown in the Figures and described herein. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 503, and a non-volatile storage device 504. Computing system 500 may optionally include a display subsystem 506, input subsystem 508, communication subsystem 510, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 504 includes one or more physical devices configured to hold instructions executable by the logic processors to implement the methods and processes described herein. When such methods and processes are implemented, the state of non-volatile storage device 504 may be transformed—e.g., to hold different data.

Non-volatile storage device 504 may include physical devices that are removable and/or built-in. Non-volatile storage device 504 may include optical memory (e.g., CD, DVD, HD-DVD, Blu-Ray Disc, etc.), semiconductor memory (e.g., ROM, EPROM, EEPROM, memory, etc.), and/or magnetic memory (e.g., hard-disk drive, floppy-disk drive, tape drive, MRAM, etc.), or other mass storage device technology. Non-volatile storage device 504 may include nonvolatile, dynamic, static, read/write, read-only, sequential-access, location-addressable, file-addressable, and/or content-addressable devices. It will be appreciated that non-volatile storage device 504 is configured to hold instructions even when power is cut to the non-volatile storage device 504.

Volatile memory 503 may include physical devices that include random access memory. Volatile memory 503 is typically utilized by logic processor 502 to temporarily store information during processing of software instructions. It will be appreciated that volatile memory 503 typically does not continue to store instructions when power is cut to the volatile memory 503.

Aspects of logic processor 502, volatile memory 503, and non-volatile storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "mechanism," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 504, using portions of volatile memory 503. It will be understood that different modules, programs, mechanisms and/or engines may be instantiated from the same application, service, code block, object, library, routine, API, function, etc. Likewise, the same module, program, mechanism and/or engine may be instantiated by different applications, services, code blocks, objects, routines, APIs, functions, etc. The terms "module," "program," "mechanism" and "engine" may encompass individual or groups of executable files, data files, libraries, drivers, scripts, database records, etc.

When included, display subsystem 506 may be used to present a visual representation of data held by non-volatile storage device 504. The visual representation may take the form of a graphical user interface (GUI). As the herein described methods and processes change the data held by the non-volatile storage device, and thus transform the state of the non-volatile storage device, the state of display subsystem 506 may likewise be transformed to visually represent changes in the underlying data. Display subsystem 506 may include one or more display devices utilizing virtually any type of technology. Such display devices may be combined with logic processor 502, volatile memory 503, and/or non-volatile storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 510 may be configured to communicatively couple various computing devices described herein with each other, and with other devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "includes," "has," "comprising," "including" and/or "having," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. This description has been presented for purposes of illustration and description, but is not intended to be exhaustive or limiting in the form disclosed. Many modifications and variations will be apparent to those of ordinary skill in the art without departing from the scope and spirit of the technology. The embodiment was chosen and described in order to best explain the principles of the technology and the practical application, and to enable others of ordinary skill in the art to understand the technology for various embodiments with various modifications as are suited to the particular use contemplated.

Although specific embodiments have been described, it will be understood by those of skill in the art that there are other embodiments that are equivalent to the described embodiments. Accordingly, it is to be understood that the technology is not to be limited by the specific illustrated embodiments, but only by the scope of the appended claims.

The invention claimed is:

1. A system comprising:
a processor; and
memory storing instructions that, when executed by the processor, cause the processor to perform acts comprising:
obtaining a webpage, wherein a topical authority score with respect to a topic is to be computed for the webpage, and further wherein the topical authority score is representative of authoritativeness of the webpage with respect to the topic;
computing hybrid embeddings for words in the webpage, where the hybrid embeddings are based upon semantic embeddings for the words in the webpage and visual embeddings for the words in the webpage, wherein the visual embeddings are based upon visual features of the words;
computing a key phrase score for a sequence of words in the words, wherein the key phrase score is computed based upon the hybrid embeddings computed for the words; and
assigning the topical authority score to the webpage based upon the key phrase score computed for the sequence of words, wherein the webpage is ranked in a ranked list of search results returned to a user based upon:
a query received from the user; and
the topical authority score assigned to the webpage.

2. The system of claim 1, wherein the hybrid embeddings are based further upon positional embeddings for the words in the webpage, the positional embeddings being representative of positions of the words in the webpage.

3. The system of claim 2, wherein the word embeddings, the visual embeddings, and the positional embeddings are concatenated together to form the hybrid embeddings.

4. The system of claim 1, wherein the visual features of the words comprise at least one of location, size, font, and HTML structure of the words.

5. The system of claim 1, the acts further comprising computing key phrase scores for several sequences of words in the words, wherein the topical authority score assigned to the webpage is based upon the key phrase scores computed for the several sequences of words.

6. The system of claim 5, wherein the several sequences of words have different lengths.

7. The system of claim 1, wherein the acts are performed by a search engine.

8. A method performed by a computing system, the method comprising:
obtaining a webpage, wherein a topical authority score with respect to a topic is to be computed for the webpage, and further wherein the topical authority score is representative of authoritativeness of the webpage with respect to the topic;
computing hybrid embeddings for words in the webpage, where the hybrid embeddings are based upon semantic embeddings for the words in the webpage and visual embeddings for the words in the webpage, wherein the visual embeddings are based upon visual features of the words;
computing a key phrase score for a sequence of words in the words, wherein the key phrase score is computed based upon the hybrid embeddings computed for the words; and
assigning the topical authority score to the webpage based upon the key phrase score computed for the sequence of words, wherein the webpage is ranked in a ranked list of search results returned to a user based upon:
a query received from the user; and
the topical authority score assigned to the webpage.

9. The method of claim 8, wherein the hybrid embeddings are based further upon positional embeddings for the words in the webpage, the positional embeddings being representative of positions of the words in the webpage.

10. The method of claim 9, wherein the word embeddings, the visual embeddings, and the positional embeddings are concatenated together to form the hybrid embeddings.

11. The method of claim 8, wherein the visual features of the words comprise at least one of location, size, font, and HTML structure of the words.

12. The method of claim 8, further comprising computing key phrase scores for several sequences of words in the words, wherein the topical authority score assigned to the webpage is based upon the key phrase scores computed for the several sequences of words.

13. The method of claim 12, wherein the several sequences of words have different lengths.

14. The method of claim 8, wherein the acts are performed by a search engine.

15. A non-transitory computer-readable medium that stores instructions that, when executed by a processor, cause the processor to perform acts comprising:
   obtaining a webpage, wherein a topical authority score with respect to a topic is to be computed for the webpage, and further wherein the topical authority score is representative of authoritativeness of the webpage with respect to the topic;
   computing hybrid embeddings for words in the webpage, where the hybrid embeddings are based upon semantic embeddings for the words in the webpage and visual embeddings for the words in the webpage, wherein the visual embeddings are based upon visual features of the words;
   computing a key phrase score for a sequence of words in the words, wherein the key phrase score is computed based upon the hybrid embeddings computed for the words; and
   assigning the topical authority score to the webpage based upon the key phrase score computed for the sequence of words, wherein the webpage is ranked in a ranked list of search results returned to a user based upon:
   a query received from the user; and
   the topical authority score assigned to the webpage.

16. The non-transitory computer-readable medium of claim 15, wherein the hybrid embeddings are based further upon positional embeddings for the words in the webpage, the positional embeddings being representative of positions of the words in the webpage.

17. The non-transitory computer-readable medium of claim 16, wherein the word embeddings, the visual embeddings, and the positional embeddings are concatenated together to form the hybrid embeddings.

18. The non-transitory computer-readable medium of claim 15, wherein the visual features of the words comprise at least one of location, size, font, and HTML structure of the words.

19. The non-transitory computer-readable medium of claim 15, the acts further comprising computing key phrase scores for several sequences of words in the words, wherein the topical authority score assigned to the webpage is based upon the key phrase scores computed for the several sequences of words.

20. The non-transitory computer-readable medium of claim 19, wherein the several sequences of words have different lengths.

* * * * *